(12) United States Patent
Junker et al.

(10) Patent No.: US 9,782,930 B2
(45) Date of Patent: Oct. 10, 2017

(54) METHOD AND SYSTEM FOR IMPREGNATING FIBERS TO FORM A PREPREG

(71) Applicant: Cytec Industries Inc., Woodland Park, NJ (US)

(72) Inventors: Shawn Junker, Greenville, TX (US); Larry Reynolds, Placentia, CA (US)

(73) Assignee: Cytec Industries Inc., Woodland Park, NJ (US)

( * ) Notice: Subject to any disclaimer, the term of this patent is extended or adjusted under 35 U.S.C. 154(b) by 0 days.

(21) Appl. No.: 14/537,977

(22) Filed: Nov. 11, 2014

(65) Prior Publication Data

US 2015/0145163 A1    May 28, 2015

Related U.S. Application Data

(60) Provisional application No. 61/907,561, filed on Nov. 22, 2013.

(51) Int. Cl.
*B32B 5/24* (2006.01)
*B32B 5/26* (2006.01)
(Continued)

(52) U.S. Cl.
CPC .............. *B29C 66/45* (2013.01); *B29B 15/12* (2013.01); *B29C 35/02* (2013.01); *B29C 35/16* (2013.01);
(Continued)

(58) Field of Classification Search
CPC ......... B29B 15/12; B29C 35/02; B29C 35/16; B29C 43/28; B29C 66/721; B29C 66/7212; B29C 66/7214; B29C 66/72141; B29C 66/834; B29C 66/8341; B29C 66/83411; B29C 66/83413; B29C 66/83421;
(Continued)

(56) References Cited

U.S. PATENT DOCUMENTS 4,051,214 A * 9/1977 Casper .................. B29C 70/22
264/137 X
4,334,468 A 6/1982 Guttinger et al.
(Continued)

FOREIGN PATENT DOCUMENTS

AT          210619 B      8/1960
CN      101845232 A  *  9/2010 ............ B29C 70/50
(Continued)

*Primary Examiner* — Leo B Tentoni
(74) *Attorney, Agent, or Firm* — Thi Dang

(57) ABSTRACT

A method for impregnating a fibrous material with a curable resin to form a prepreg is disclosed. The method includes conveying a web material through at least one moving pressure nip formed between a moving pressure roller and a moving supporting surface, wherein the moving pressure roller and the moving supporting surface travel at different velocities relative to each other resulting in a relative velocity between the web material and the pressure nip. The at least one moving pressure nip travels in the same direction as the web material while applying sufficient pressure to compress the web material and to affect impregnation of the fibrous material with the curable resin. Also disclosed is a system for implementing the disclosed impregnation method.

13 Claims, 5 Drawing Sheets

(51) Int. Cl.
  *B32B 5/28*      (2006.01)
  *B32B 37/10*     (2006.01)
  *C08J 5/24*      (2006.01)
  *B29C 65/00*     (2006.01)
  *B29C 70/50*     (2006.01)
  *B29B 15/12*     (2006.01)
  *B29C 35/02*     (2006.01)
  *B29C 35/16*     (2006.01)
  *B29K 63/00*     (2006.01)
  *B29K 307/04*    (2006.01)
  *B29L 7/00*      (2006.01)
  *B29L 9/00*      (2006.01)

(52) U.S. Cl.
  CPC ........ *B29C 66/721* (2013.01); *B29C 66/7212* (2013.01); *B29C 66/7214* (2013.01); *B29C 66/72141* (2013.01); *B29C 66/82* (2013.01); *B29C 70/504* (2013.01); *B29C 70/506* (2013.01); *B29K 2063/00* (2013.01); *B29K 2307/04* (2013.01); *B29L 2007/002* (2013.01); *B29L 2009/00* (2013.01)

(58) Field of Classification Search
  CPC . B29C 66/83431; B29C 70/50; B29C 70/504; B29C 70/506; B32B 5/24; B32B 5/26; B32B 5/28; B32B 37/10; B32B 37/1027; B32B 37/1036; C08J 5/24
  USPC .. 264/134, 136, 137, 171.1, 171.13, 171.24, 264/172.19, 173.1
  See application file for complete search history.

(56) References Cited

U.S. PATENT DOCUMENTS

| | | | |
|---|---|---|---|
| 4,457,683 A * | 7/1984 | Gerhardt | B30B 9/04 425/373 |
| 4,485,733 A | 12/1984 | Held | |
| 5,044,269 A | 9/1991 | Bielfeldt | |
| 5,733,624 A | 3/1998 | Syme et al. | |
| 6,009,803 A | 1/2000 | Pankoke et al. | |
| 6,908,295 B2 | 6/2005 | Thielman et al. | |
| 2004/0238107 A1 | 12/2004 | Velleman et al. | |
| 2012/0100362 A1* | 4/2012 | Ellis | B32B 5/26 428/298.1 |

FOREIGN PATENT DOCUMENTS

| | | | |
|---|---|---|---|
| EP | 0312993 A2 | 4/1989 | |
| FR | 1203872 A | 1/1960 | |
| GB | 2040801 A | 9/1980 | |
| WO | WO-2005091715 A2 * | 10/2005 | ............ B29C 70/50 |

* cited by examiner

METHOD AND SYSTEM FOR IMPREGNATING FIBERS TO FORM A PREPREG

This application claims the benefit of prior U.S. Provisional Application No. 61/907,561 filed on Nov. 22, 2013, which is incorporated herein in its entirety.

BACKGROUND

Prepreg composite materials have been widely used in various high-performance structures, such as aircraft and automobile components, and sport equipment (e.g., fishing rods, golf club shafts, badminton rackets, tennis rackets, etc.). A prepreg is a fiber reinforcement that is pre-impregnated with a matrix resin, typically a thermoset resin. The fibers reinforce the matrix resin, bearing the majority of the load supported by the prepreg material, while the resin matrix bears a minority portion of the load supported by the prepreg material and also transfers load from broken fibers to intact fibers. In this manner, the prepreg material can support greater loads than either the matrix resin or fibers can support alone. Furthermore, by tailoring the reinforcing fibers in a particular geometry or orientation, a composite material can be efficiently designed to minimize weight and volume while maximizing strength.

Prepregs may be manufactured by impregnating a web of continuous fibers or a fabric with a matrix resin, creating a pliable and tacky sheet of material. During impregnation, the reinforcing fibers are impregnated with the matrix resin in a controlled fashion. The precise specification of the fibers, their orientation and the formulation of the resin matrix can be specified to achieve the optimum performance for the intended use of the prepregs. The mass of fibers per square meter can also be specified according to requirements.

The term "impregnate" refers to the introduction of a matrix resin to reinforcement fibers so as to partially or fully encapsulate the fibers with the resin. The impregnation process controls the amount of resin inside the fiber bed and at the surface of the fiber bed. Furthermore, the resin impregnation level impacts the methods used to assemble the finished composite part and the part's quality. The matrix resin for making prepregs may take the form of resin films or liquids. Typically, impregnation is facilitated by the application heat and/or pressure. The resulting prepregs produced from the prepreg fabrication process is in an uncured or curable state (i.e., not hardened) and may be frozen in order to inhibit the polymerization of the resin. For manufacturing composite parts from prepregs, the cold prepregs are thawed to room temperature, cut to size, and assembled on a molding tool through various methods, such as hand layup, Automated Tape Layup (ATL), and Advanced Fiber Placement (AFP). The prepreg material for each assembly method requires different levels of impregnation and different levels of tack. Level of "tack" refers to how well prepregs stick to one another and to a tool surface. For example, for hand layup, there is less need for high level of impregnation and greater need for tack while with AFP the fiber bed requires much higher levels of impregnation. Once in place, the prepregs are consolidated and cured under pressure to achieve the required fiber volume fraction with minimal voids.

Currently, many conventional methods for impregnating continuous fiber material involve the use of static pressure-applying mechanism. Roller nips, for example, have been used to supply pressure from a fixed position in space while a continuous web moves through the static nips. These conventional processes are generally limited to a web speed of 1 to 4 m/min for high impregnation of thick resin films and fiber materials. They are also limited in their operating temperatures as higher temperatures tend to cause problems with premature curing of the resin or swelling in the case of thermoplastic resin. Essentially, what dominates the prepreg world are the fundamental physical limitations outlined in Darcy's law: the rate of fluid flow is a function of the pressure supplied, the thickness of the body, the permeability of the body of interest and the viscosity of the fluid. In the case of carbon fiber webs, the body has a dynamic permeability and the fluid has a dynamic viscosity, i.e. viscosity which changes with shear rate and temperature. This law cannot be over-ridden. Different fiber materials, different resins, different pressures and web speeds all change the shape and movement of the function but do not change the law. So a static nip or a belt under certain pressures and temperatures will always limit the production speed of the material. If the web is moving too fast, a static nip cannot press enough resin into the fiber web. If the temperature applied to the resin is too hot, the material will distort and will be ruined, and if too cold, there is insufficient force to press the resin into the fiber web.

In light of the issues discussed above, there remains a need for an improved resin impregnation technique that can increase prepreg production rate without sacrificing the control of impregnation level.

DETAILED DESCRIPTION

Disclosed herein is a prepreg fabrication method with an improved resin impregnation technique—referred herein as relative speed impregnation (RSI). The impregnation technique disclosed herein is related to resin film impregnation in which at least one resin film is pressed against each of the top and bottom surfaces of a continuous fibrous web to produce a continuous prepreg, in which the fibrous material is embedded within a matrix resin. The fibrous web is composed of reinforcement fibers and may be in the form of unidirectional fibers or a fabric (woven or nonwoven). The term "impregnate" as used herein refers to the introduction of a curable matrix resin to reinforcement fibers so as to partially or fully encapsulate the fibers with the matrix resin.

An objective of the RSI technique is to produce the fastest prepreg production speed with the least fiber bed distortion and minimum pressure to achieve a desired impregnation level. To that end, an impregnation zone configuration is designed so that a web of resin-fiber material moving at a first velocity ($V_w$), often called "line speed," through an impregnation zone while pressure is applied by at least one moving pressure nip moving at a second velocity ($V_n$) and in the same direction as that of the moving web. The moving pressure nip is formed between a moving pressure roller and a moving surface supporting the web material. The moving surface is configured so as to mitigate the friction forces to the contacting surface of the web material. According to a preferred embodiment, the moving surface is part of a rotating drum with a relative large cross-sectional diameter. $V_w$ and $V_n$ are the operating velocities relative to a fix point on the ground. $V_w$ is different from $V_n$, whereby the difference between $V_w$ and $V_n$ is the relative velocity ($V_{rel}$) between the web material and the pressure nip. The level of impregnation is affected by the relative velocity ($V_{rel}$).

Figure 1:
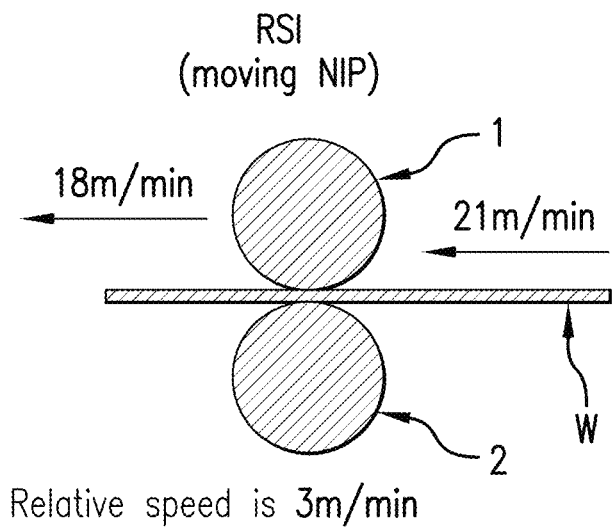
FIG. 1 illustrates the general concept of Relative Speed Impregnation technique according to the present disclosure.

FIG. 1 illustrates the general concept of the RSI technique. In this figure, the web material W (composed of a layer reinforcement fibers sandwiched between two resin films) is moving at a line speed of 21 m/min while pressure is applied by the moving pressure nip formed between rollers 1 and 2, each roller rotating about its own central axis. The pressure nip is moving in the same direction as that of the web material W at a velocity of 18 m/min. This means that the relative velocity ($V_{rel}$) between the web material W and the moving pressure nip is 3 m/min. As such, the line speed (i.e. production rate) of the web material is 7 times that of the relative velocity ($V_{rel}$). The line speed speeds as discussed in the present disclosure may be measured using conventional speed sensing devices such as tachometers.

Figure 2:
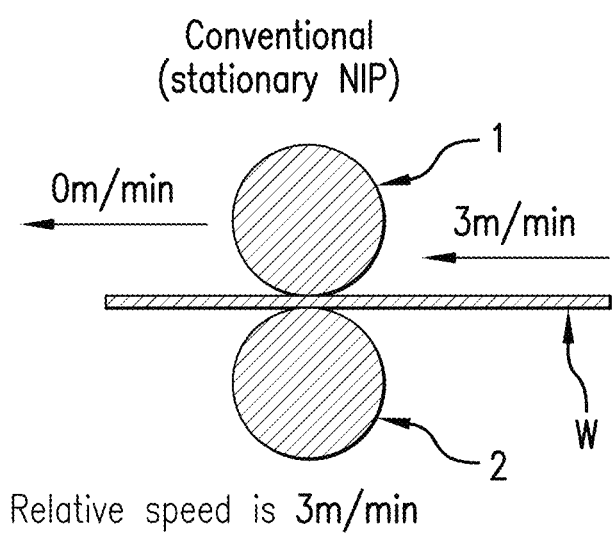
FIG. 2 illustrates a conventional technique of applying static pressure nip to affect impregnation.

In contrast, conventional prepreg fabrication methods typically involve applying static pressure nip to affect impregnation as illustrated in FIG. 2. In FIG. 2, the pressure nip formed by rollers 1 and 2 is stationary (i.e., velocity is 0 m/min) as the web material is passing through the nip. In this case, the line speed of the web material is the same as the relative velocity ($V_{rel}$), and consequently, the line speed of the web material is limited to the relative speed ($V_{rel}$). As such, in order to achieve the same level of impregnation at $V_{rel}$ of 3 m/min as in the RSI technique, the line speed of the web material is limited to 3 m/min.

The advantage of the RSI process is that the physics of impregnation is decoupled from the line speed of the web material, thereby enabling a significantly higher prepreg production rate at identical levels of impregnation as compared to conventional impregnation methods using static pressure nips or belts. These conventional methods generally require immense forces and complicated control systems.

Figure 3:
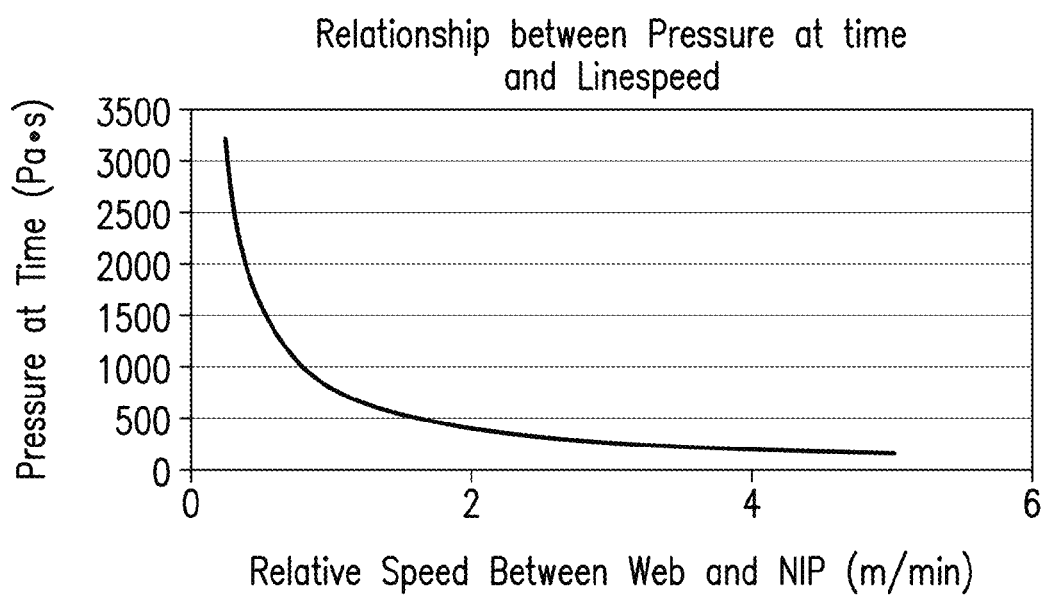
FIG. 3 is a graph showing the relationship between pressure-at-time and relative velocity ($V_{rel}$) between a moving web material and the pressure nip applied during impregnation.

In order to provide impregnation, pressure-at-time is required—the pressure applied to web material (not too high or too low) and time provided by slow speed. Pressure-at-time may be calculated as $P/V_{rel}$—the linear force (P) applied to the web material divided by the relative velocity ($V_{rel}$), and is measurable in units of Pascal-second (Pa·s), equivalent to kg/m/s. The linear force (P) is the downward force per linear width, e.g. pounds per inch (PLI) or Newtons per meter (N/m), exerted by the pressure roller (upper roller 1, FIG. 1), which is measured along the width of the web material. The relationship between pressure-at-time and relative velocity $V_{rel}$ is hyperbolic as illustrated in FIG. 3. As $V_{rel}$ is decreased, pressure-at-time dramatically increases. And the impregnation level goes up with pressure-at-time. As such, it is desirable to keep $V_{rel}$ as low as possible. The optimum $V_{rel}$ is dependent on the resin properties (e.g. viscosity) and permeability of the fiber web (e.g. openings or voids in the fiber layer, spacing/interstices between fibers, etc.).

According to a preferred embodiment, the RSI process is carried out by moving a web material (which is composed of a fiber layer sandwiched between two resin films) through an impregnation assembly having one or more moving pressure nips applying pressure-at-time of up to 10 MPa·s, or up to 7 MPa·s in certain embodiments, to achieve the required level of impregnation, e.g. up to 100% impregnation level. The pressure-at-time in this context refers to that applied by the entire impregnation assembly. The level of impregnation refers to how far the resin has penetrated through the thickness of the fiber layer. If the resin has penetrated through the entire thickness of the fiber layer, filling all interstices/gaps/openings therein, and there is substantially no resin-free region at the center of the fiber layer, then 100% or full impregnation has been achieved. Because impregnation is decoupled from the line speed of the web material, the line speed is limited only by the size of the manufacturing equipment. As an example, in conventional impregnation methods using static-nip arrangement, s-wraps, or pressure belts, the line speed of a high viscosity web material with a thick fiber bed may be up to 15 ft/min (3 m/min), while the RSI process is capable of increasing the line speed by more than 10 fold.

Figure 4:
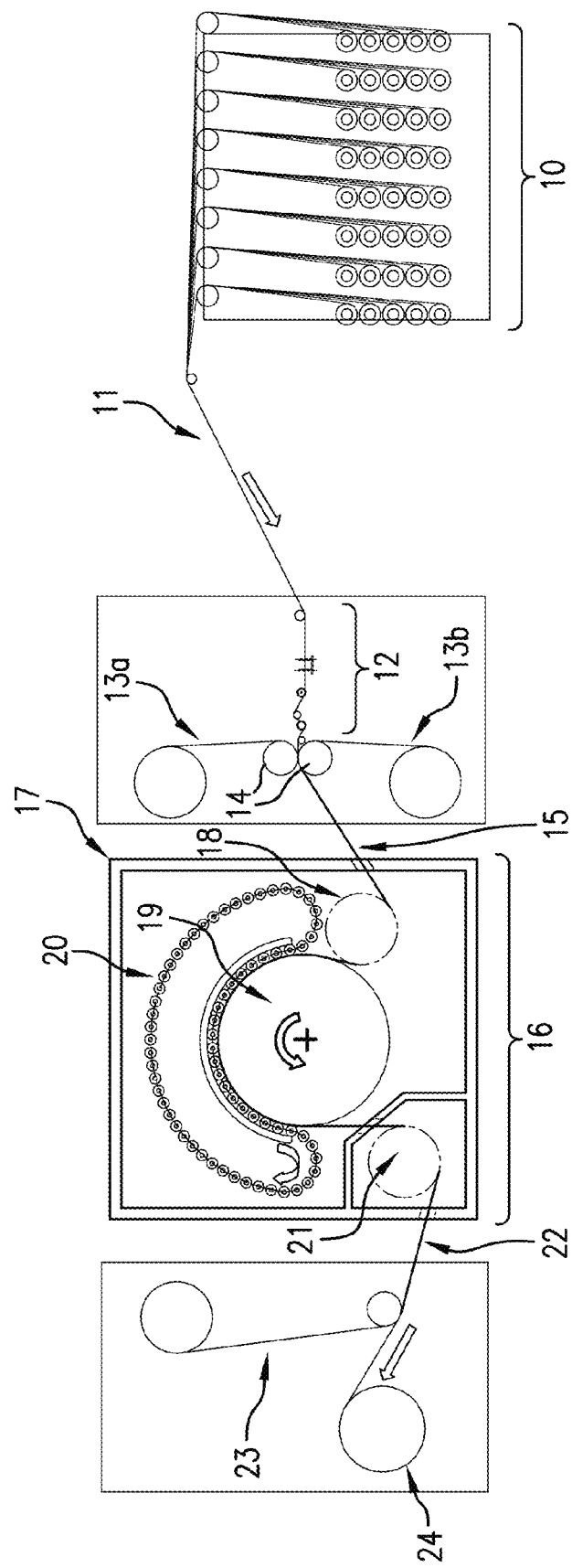
FIG. 4 shows an embodiment of a prepreg fabrication system.

An embodiment of a prepreg fabrication system with means for implementing the RSI process is shown in FIG. 4. Referring to FIG. 4, the prepreg fabrication process starts with conveying continuous fiber bundles 11 from a fiber supply unit 10 to a fiber spreading section 12. The fiber supply unit 10 includes a plurality of spools for winding the fiber bundles and creels for supporting the spools. Each fiber bundle is composed of a plurality of fiber filaments. The fiber spreading section 12 is equipped with suitable means for spreading the fiber bundles before contacting the fibers with the resin films. As such, the spread fibers appear as a sheet of unidirectionally aligned fiber filaments with small spacing between adjacent filaments. Guide rollers are positioned along the traveling path of the fiber bundles to guide the fiber bundles and to provide the necessary tension therein. The spread fiber filaments from the fiber spreading section 12 are then combined with an upper resin film 13a and a lower resin film 13b with the aid of rollers 14 so that the fiber filaments are sandwiched between the two resin films. Each resin film is supplied by its own supply roll and the surface that is not in contact with the fiber filaments is covered by a release paper. The resulting web material 15 is next conveyed through an impregnation zone 16, which includes an insulated chamber 17 enclosing a pre-heating roll 18, a rotating drum 19, an endless roller chain 20 of linking idler rollers, and a thermally-isolated, chill roll 21.

The pre-heating roll 18 is positioned at the beginning of the impregnation zone and upstream of the drum 19. Prior to entering the impregnation zone 16, the resin films are in a solid state and may be kept at a cold temperature during storage in order maintain their solidified state. Immediately after the web material 15 enters the chamber 17, the pre-heating roll 18 applies heat to the web material in an amount sufficient to decrease the resin viscosity so that the resin is softened but not high enough to cause substantial curing of the resin.

The chamber 17 is equipped with suitable temperature control mechanisms (not shown), for example, infra-red sensors mounted onto the sidewall of the chamber 17, to provide temperature data for the web material, the drum 19, the roller chain 20 as well as the tension of the web material entering and exiting the chamber 17. According to one embodiment, the temperature in chamber 17 may be maintained within the range of 50° C. to 120° C., which is sufficient for most commercially available resin systems. During impregnation, the resin penetrates into the interstices/spacing between the fiber filaments. The resin viscosity is stabilized and maintained at a desired level as the web material travels through the entire impregnation zone with the aid of the temperature control mechanism in the chamber 17. According to one embodiment, the viscosity of the resin during impregnation is dependent upon the target resin system but may range from 0.03 Pa·s to 7000 Pa·s.

The drum 19 provides a moving support surface for the web material during impregnation and cooperates with the roller chain 20 to establish moving pressure nips through which the web material passes. The web material wraps around a portion of the drum's outer surface as the drum rotates. The large cross-sectional diameter of the drum 19 provides a physical platform for handling the nip pressures with the least amount of curvature possible. The roller chain 20 is configured to carry a series of closely spaced, idler rollers having elongated, cylindrical bodies with lengths extending transversely to the travel direction of the web material, each idler roller being freely rotatable about its own axis. The idler rollers are linked to each other by suitable linking mechanisms, for example, each idler roller may have a pin (a connecting mechanism) at one axial end connected to a corresponding link in an endless chain of connecting links. The roller chain 20 is caused to revolve by a suitable chain drive. The number of idler rollers in the chain 20 may be varied depending on factors such as the required levels of force and web pressure, the desired web width and commensurate deflection needs.

During operation, the roller chain 20 revolves in a direction opposite to the rotational direction of the drum 19 while some of the idler rollers in the roller chain 20 are pressed against a portion of the drum's outer surface and against the web material passing there between, thereby creating a plurality of pressure nips moving at velocity $V_n$. The rotational velocity of the drum 19, which is driven by a suitable drive motor, is equivalent to the line speed $V_w$ of the web material as it moves through the impregnation zone 16, and the revolving velocity of the chain roller 20 is equivalent to the velocity $V_n$ of the moving pressure nips. As such, the web material is being compressed by the outer circumferential surface of the rotating drum 19 and the moving idler rollers in the chain 20 to affect impregnation. As discussed above, the line speed $V_w$ of the web material as it moves through the impregnation zone 16 is different from the velocity $V_n$ of the moving pressure nips created by the drum 19 and the roller chain 20, such that a pre-determined relative velocity $V_{rel}$ can be established, wherein $V_{rel}=V_w-V_n$. By this arrangement, a pressure-at-time of up to 10 MPa·s can be achieved. The pressure-at-time in this context refers to that applied by the pressure nips created between the drum 19 and the chain roller 20.

Still referring to FIG. 4, the chill roll 21 is located downstream from the drum 19 in a separate, thermally-isolated compartment, and is configured to lower the temperature of the web material sufficiently to increase the resin viscosity and lock in impregnation. The cooled, web material exiting the impregnation zone 16 is a prepreg 22 with a set thickness and solidified resin component. After the prepreg 22 exited the impregnation zone 16, the release paper 23 on one side of the prepreg 22 is peeled off, and then the prepreg 22 is taken up by a winding roll 24.

Figure 5:
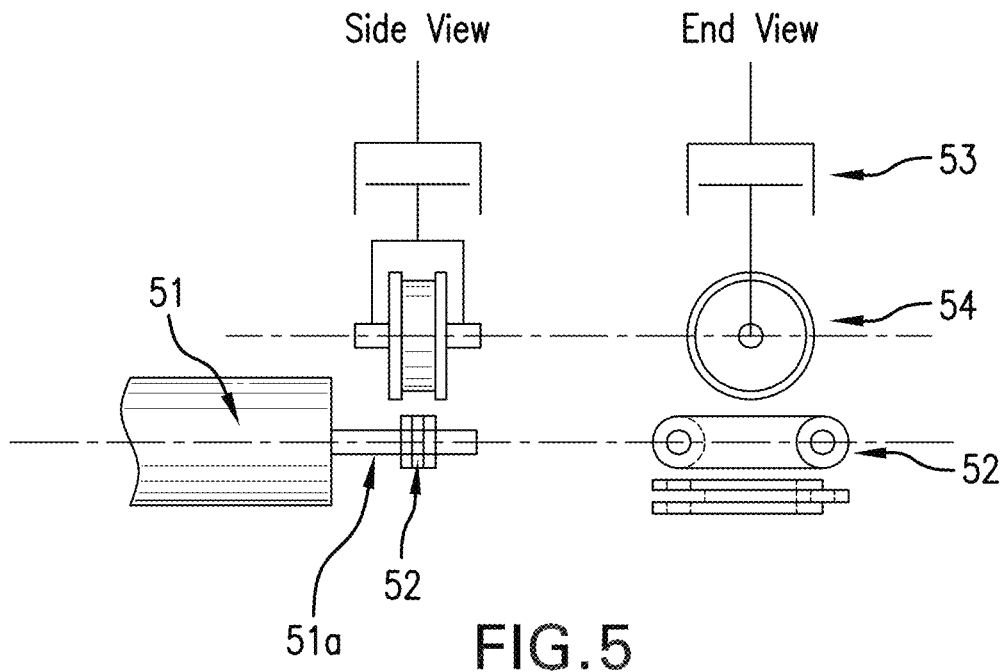
FIG. 5 shows an embodiment a static pressure applicator for pressing an idler roller against a web material.
Figure 6:
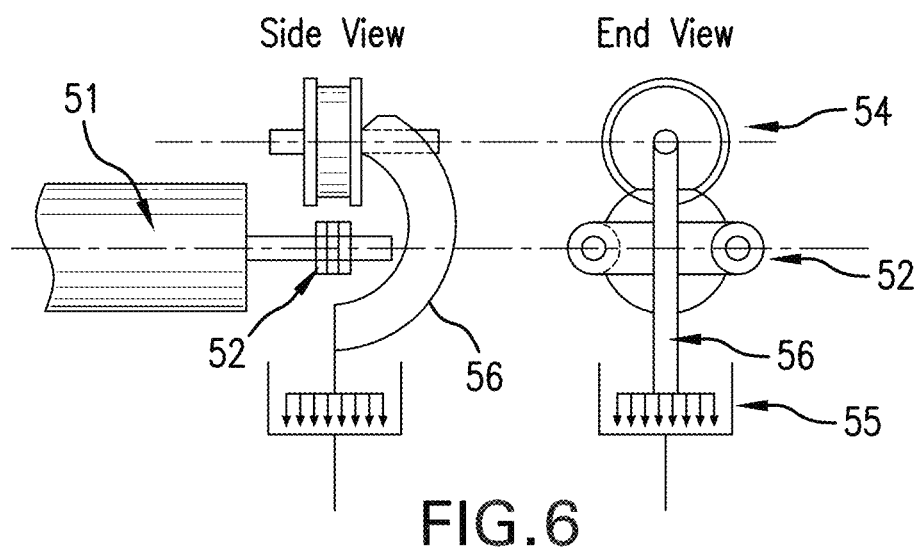
FIG. 6 shows another embodiment of a static pressure applicator for pressing an idler roller against a web material.

The mechanisms for applying pressure load to the idling rollers as they come into contact with the outer surface of drum 19 may vary depending on the equipment design. Some examples are shown in FIGS. 5 and 6. FIG. 5 shows an embodiment for pressing down onto a chain link connected to the idler roller in the roller chain 20 using a static pressure applicator. Referring to FIG. 5, one of the idler rollers 51 in the roller chain 20 is shown to have a shaft idler 51a at its axial end connected to a corresponding link 52, which is part of an endless link chain. The static pressure applicator includes a piston 53 connected to a pressure roller 54 so as to drive the movement of the pressure roller 54 either up or down. The pressure roller 54 is freely rotatable about its own axis and is configured to move in and out of engaging contact with the chain link 52. The piston 53 is positioned above the pressure roller 54 and is controlled to provide the necessary pressure downward onto the chain link 52 or to release the pressure.

FIG. 6 shows an embodiment for pulling down onto the chain link connected to the idler roller using a static pressure applicator. In this embodiment, the pressure roller 54 for engaging the chain link 52 is connected to piston 55 via extension arm 56 positioned below the idler roller 51. The movement of the pressure roller 54 together with extension arm 56 is driven by the piston 55. By this arrangement, the pressure roller 54 can be pulled down into engaging contact with or lifted away from the chain link 52 by the piston 55.

A plurality of pressure applicators of the type shown in FIG. 5 or FIG. 6 may be positioned adjacent to the section of the roller chain 20 that faces the drum 19 so as to engage each idler roller in the roller chain 20 that comes into contact with the web material passing between the roller chain 20 and the drum 19, or only selected contacting idler rollers (e.g. every other idler roller).

Figure 7A:
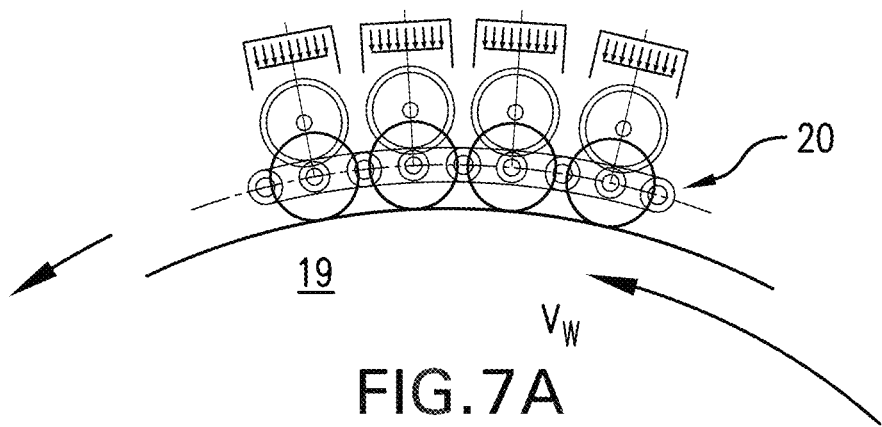
FIGS. 7A-7C illustrate the roller chain progression under static pressure applicators according to an embodiment of applying pressure against a moving web material.
Figure 7B:
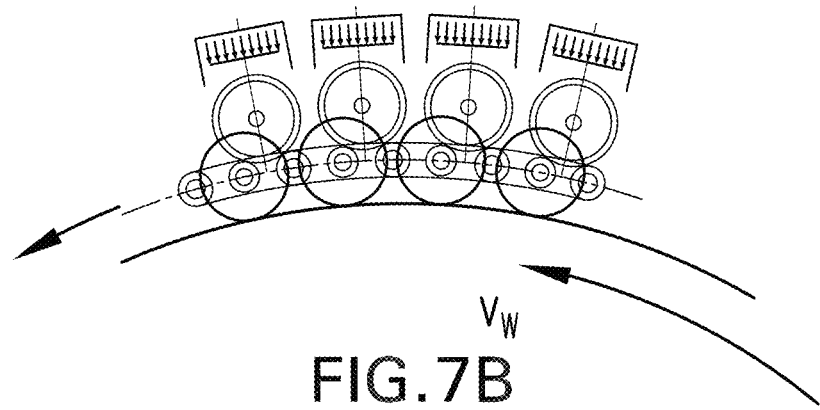
Figure 7C:
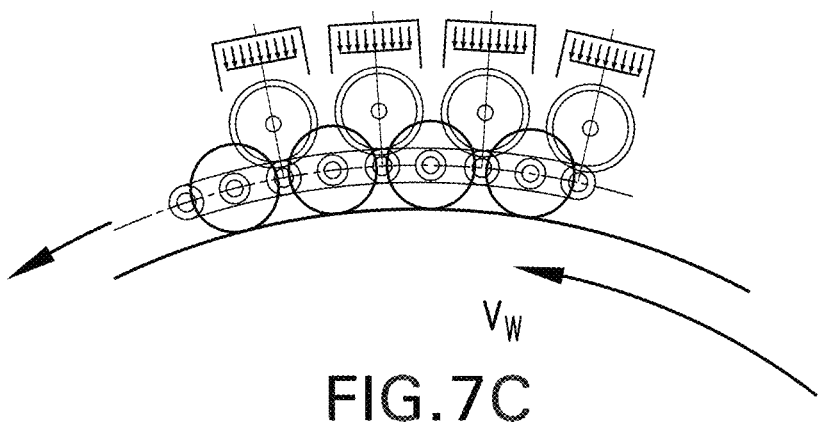

FIGS. 7A-7C show the roller chain progression in an embodiment in which an array of static pressure applicators (of the type shown in FIG. 5) cooperates with the roller chain 20 to apply pressure over the drum 19 such that the pressure experienced by the chain idler rollers smoothly transitions from one idler roller to the next. Each of FIGS. 7A-7C represents a snapshot at different time in the roller chain progression.

For measuring the load on the idler rollers disclosed herein, load cells can be employed, or hydraulic/pneumatic pressures can be derived from the loading systems of the rollers.

It should be understood that various modifications of the fabrication system shown in FIG. 4 are contemplated. In an alternative embodiment, the creel-containing unit 10 and the spreader section 12 are replaced by mechanisms for supplying a continuous, self-supporting fabric web. The self-supporting fabric web may be a woven fabric or a non-woven fabric (e.g. non-crimp fabric) composed of reinforcement fibers.

Furthermore, FIG. 4 depicts a two-film impregnation method, in which an upper resin film and a lower resin film are pressed against the top and bottom surfaces of the fiber web, respectively, so that the fiber web is sandwiched between the two resin films. However, it should be understood that the same fabrication system can be modified to incorporate additional resin films for impregnation. As an example, an additional impregnation zone may be added downstream from the impregnation zone 16 and additional resin films may be applied onto both the upper surface and the lower surface of the impregnated web material exiting from the impregnation zone 16, in the same manner for applying the resin films 13a and 13b, but with the removal of the release papers from both sides of the web material exiting from the impregnation zone 16.

The RSI process disclosed herein decouples resin infiltration rate (pressure, viscosity and time limitations) from production rate by moving the pressure points (i.e. nips) with the web material such that the web material experiences longer time at pressure even though the web material and nips are moving fast. The use of a rotatable drum as shown in FIG. 4 instead of a second belt or a flat plate as known in the prior art mitigates the difficulties associated with upper and lower roll alignment and static plate friction which would rip apart the paper.

The reinforcement fibers for fabricating the prepregs may take the form continuous fibers, tows, or self-supporting woven or non-woven fabrics. Fiber structures may comprise a plurality of tows, each tow composed of multiple filaments, e.g. 3-12 thousands of filaments. The non-woven fabrics may include non-crimp fabrics in which the tows may be held in position by cross-tow stitches, weft-insertion knitting stitches, or a small amount of resin binder, such as a thermoplastic resin.

The fiber material includes, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof. For the fabrication of high-strength composite materials, e.g. for aerospace and automotive applications, it is preferred that the reinforcing fibers have a tensile strength of greater than 3500 MPa.

Generally, the matrix resin for impregnating the reinforcement fibers is based on a curable resin system containing thermoset or thermoplastic resins as the major component in combination with minor amounts of additives such as curing agents, catalysts, co-monomers, rheology control agents, tackifiers, rheology modifiers, inorganic or organic fillers, thermoplastic or elastomeric toughening agents, stabilizers, inhibitors, pigments/dyes, flame retardants, reactive diluents, and other additives well known to those skilled in the art for modifying the properties of the resin matrix before or after curing.

The thermoset resins may include, but are not limited to, epoxy, unsaturated polyester resin, bismaleimide, polyimide, cyanate ester, phenolic, etc. In one embodiment, the resin matrix is an epoxy-based resin formulation which contains one or more multifunctional epoxy resins (i.e. polyepoxides) as the main polymeric component.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of bisphenols such as bisphenol A, bisphenol F, bisphenol S and bisphenol K; and polyglycidyl ethers of cresol and phenol based novolacs.

The addition of curing agent(s) and/or catalyst(s) may increase the cure rate and/or reduce the cure temperatures of the matrix resin. The curing agent for thermoset resins is suitably selected from known curing agents, for example, guanidines (including substituted guanidines), ureas (including substituted ureas), melamine resins, guanamine derivatives, amines (including primary and secondary amines, aliphatic and aromatic amines), amides, anhydrides (including polycarboxylic anhydrides), and mixtures thereof.

The matrix resin may include toughening agents such as thermoplastic and elastomeric polymers, and polymeric particles such as core-shell rubber particles, polyimide particles, and polyamide particles. The matrix resin may also include inorganic fillers such as fumed silica quartz powder, alumina, and platy fillers such as mica, talc or clay (e.g., kaolin).

To form the resin films for prepreg fabrication, the matrix resin may be prepared in liquid form and then coated onto a release paper (i.e. carrier) to form a film of suitable areal weight. After drying, the resin film is then wound up onto a supply roll.

EXAMPLE

As an example, a prepreg with width of 12.5 in may be made by impregnating a layer of unidirectional carbon fibers with epoxy-based resin films (e.g. CYCOM 977-3 from Cytec Industries Inc.; film areal weight of 35 gsm per side) using the impregnation system shown in FIG. 4 based on the following parameters:

Line speed=15 m/min (or 50 fpm)
Pressure-at-time=7 MPa·s
Temperature at pre-heating roll=120° C.
Resin viscosity during impregnation=3000 cP
Temperature at chill roll=25° C.

What is claimed is:

1. A method of impregnating a fibrous material with a curable resin to form a prepreg comprising:
   forming a continuous web material comprising a layer of fibrous material between two films of curable resin;
   conveying the web material along a travel path and through at least one moving pressure nip formed between a moving pressure roller and a moving supporting surface,
   wherein the moving pressure roller and the moving supporting surface travel at different velocities relative to each other resulting in a relative velocity $V_{rel}$ between the web material and the pressure nip, and
   wherein the at least one moving pressure nip travels in the same direction as the web material while applying sufficient pressure to compress the web material and to affect impregnation of the fibrous material with the curable resin.

2. The method of claim 1, wherein the at least one moving pressure nip applies a pressure-at-time of up to 10 MPa·s to affect full impregnation, and
   pressure-at-time is defined as $P/V_{rel}$, where P is the linear force applied to the web material.

3. The method of claim 2, wherein the web material is conveyed through a plurality of moving pressures nips configured to establish a pressure-at-time of up to 10 MPa·s during impregnation.

4. The method of claim 2, wherein pressure-at-time is up to 7 MPa·s during impregnation.

5. The method according to claim 1, wherein the web material is traveling at a velocity of 15 m/min or greater.

6. The method according to claim 1, wherein the web material is traveling at a velocity of 100 m/min or greater.

7. The method according to claim 1, wherein
   the moving support surface is provided by a rotating drum having an outer circumferential surface, the web material wraps around a portion of the drum's outer circumferential surface as the drum rotates during impregnation, and
   the at least one moving pressure nip is a plurality of moving pressure nips, which are created by an endless roller chain of linking idler rollers revolving in a direction opposite to the rotational direction of the rotating drum while some idler rollers in the roller chain are pressed against a portion of the drum's circumferential surface and against the web material passing there between.

8. The method according to claim 1, wherein,
prior to being conveyed through at least one moving pressure nip, the web material is heated to lower the viscosity of the curable resin, and
after impregnation, the web material is cooled to increase the viscosity of the resin therein.

9. The method of claim 8, wherein heating of the web material is provided by a pre-heating roll located upstream from the rotating drum, along the travel path of the web material, and cooling of the web material is provided by a chill roll located downstream from the rotating drum.

10. The method according to claim 1, wherein the curable resin comprises at least one thermoset resin as a major component.

11. The method according to claim 1, wherein the layer of fibrous material comprises continuous, unidirectional fibers arranged parallel to each other.

12. The method according to claim 1, wherein the layer of fibrous material is in the form of a continuous, self-supporting fabric.

13. The method according to claim 1, wherein the layer of fibrous material comprises fibers selected from the group consisting of: glass fibers, carbon fibers, graphite fibers, aramid fibers, polyamide fibers, high-modulus polyethylene (PE) fibers, polyester fibers, poly-p-phenylene-benzoxazole (PBO) fibers, boron fibers, quartz fibers, basalt fibers, ceramic fibers, and combinations thereof.

* * * * *